(12) United States Patent
Wallace et al.

(10) Patent No.: US 7,447,744 B2
(45) Date of Patent: Nov. 4, 2008

(54) CHALLENGE RESPONSE MESSAGING SOLUTION

(75) Inventors: Andrew Wallace, Bellevue, WA (US);
Neil K. Koorland, Issaquah, WA (US);
Erik Hedberg, Issaquah, WA (US);
Qiang Wang, Redmond, WA (US);
Samuel J. Neely, Sammamish, WA (US); Max G. Morris, Seattle, WA (US);
Saeed Noursalehi, Naperville, IL (US)

(73) Assignee: Microsoft Corporation, Redmond, WA (US)

( * ) Notice: Subject to any disclaimer, the term of this patent is extended or adjusted under 35 U.S.C. 154(b) by 791 days.

(21) Appl. No.: 10/455,945

(22) Filed: Jun. 6, 2003

(65) Prior Publication Data

US 2004/0249901 A1 Dec. 9, 2004

(51) Int. Cl.
*G06F 15/16* (2006.01)
*G06F 7/10* (2006.01)
*G06F 15/173* (2006.01)

(52) U.S. Cl. .............................. 709/206; 726/2; 726/3; 726/4

(58) Field of Classification Search ................. 709/206, 709/207, 225, 229; 726/14, 2–4
See application file for complete search history.

(56) References Cited

U.S. PATENT DOCUMENTS

| | | | |
|---|---|---|---|
| 6,321,267 B1 | 11/2001 | Donaldson | |
| 6,393,465 B2 * | 5/2002 | Leeds | 709/207 |
| 6,654,787 B1 | 11/2003 | Aronson | |
| 6,732,157 B1 | 5/2004 | Gordon | |
| 6,868,498 B1 | 3/2005 | Katsikas | |
| 6,901,398 B1 | 5/2005 | Horvitz | |
| 2002/0029248 A1 * | 3/2002 | Cook et al. | 709/206 |
| 2002/0181703 A1 * | 12/2002 | Logan et al. | 380/30 |
| 2002/0199095 A1 | 12/2002 | Bandini | |
| 2003/0028767 A1 * | 2/2003 | Bickford et al. | 713/169 |
| 2003/0220978 A1 * | 11/2003 | Rhodes | 709/206 |
| 2004/0003283 A1 | 1/2004 | Goodman | |
| 2004/0015554 A1 * | 1/2004 | Wilson | 709/206 |
| 2005/0055410 A1 * | 3/2005 | Landsman et al. | 709/206 |

FOREIGN PATENT DOCUMENTS

GB 2373130 A 11/2002

OTHER PUBLICATIONS

Leander Kehney, *Going to Extremes to Fight Spam*, Wired News, Mar. 3, 2003 at http://www.wired.com/news/print/0.1294,57867,00.html.

(Continued)

*Primary Examiner*—Binjob Jaroenchonwanit
*Assistant Examiner*—Philip J Chea
(74) *Attorney, Agent, or Firm*—Senniger Powers LLP (57) ABSTRACT

A method that determines if a sender's message is to be sent to a recipient is presented. A challenge module analyzes the message and sends a challenge message to the sender if the sender is not in the recipient's address store. The challenge message includes a pseudo unique token for the sender recipient pair such that the sender must respond differently to each challenge message for a particular message. In one embodiment, the challenge message requires the sender to obtain a certificate from a certificate authority or a set of authorities.

13 Claims, 5 Drawing Sheets

OTHER PUBLICATIONS

David Mertz, Ph.D., *Spam Filtering Techniques: Comparing a Half-Dozen Approaches to Eliminating Unwanted Email*, Gnosis Software, Inc., Aug. 2002 at http://gnosis.cx/publish/programming/filtering-spam.html.

Welcome to . . . ChooseYourMail.com, Access to the world you want, ChooseYourMail.com, at http://www.chooseyourmail.com/howitworks.html.

* cited by examiner

CHALLENGE RESPONSE MESSAGING SOLUTION

FIELD OF THE INVENTION

This invention relates generally to electronic messaging and, more particularly, relates to filtering undesired electronic mail.

BACKGROUND OF THE INVENTION

Electronic messaging, particularly electronic mail ("e-mail") carried over the Internet, is rapidly becoming not only quite pervasive in society but also, given its informality, ease of use and low cost, a preferred method of communication for many individuals and organizations.

Unfortunately, e-mail recipients are increasingly being subjected to unsolicited mass mailings, often referred to as spam. Most spam is commercial advertising, often for dubious products, get-rich-quick schemes, or quasi-legal services. The phenomenon of spam has become one of the Internet's biggest blemishes. With the growth of Internet-based commerce, a wide and growing variety of electronic merchandisers are repeatedly sending unsolicited mail advertising their products and services to an ever-expanding universe of e-mail recipients. Some consumers who order products or otherwise transact with a merchant over the Internet want to and, in fact, do regularly receive such solicitations from those merchants.

However, electronic mailers are continually expanding their distribution lists to reach an increasing number of recipients. For example, recipients who merely provide their e-mail addresses in response to perhaps innocuous appearing requests for visitor information generated by various web sites often receive unsolicited mail and much to their displeasure, they find that they have been included on electronic distribution lists. This occurs without the knowledge, let alone the assent, of the recipients. Some electronic mailers are now sending e-mail containing images that automatically invoke a link to a website that tracks the e-mail addresses of users who open the e-mail. The e-mail addresses are then added to the electronic mailer's distribution list. Furthermore, an electronic mailer will often disseminate its distribution list, whether by sale, lease or otherwise, to another such mailer for its use, and so forth with subsequent mailers. Consequently, over time, e-mail recipients often find themselves increasingly barraged by unsolicited mail resulting from separate distribution lists maintained by a wide and increasing variety of mass mailers. An individual can easily receive hundreds, and even thousands, of pieces of unsolicited e-mail over the course of a year. Individuals on e-distribution lists can expect to receive a considerably larger number of unsolicited messages over a much shorter period of time. Consumer groups, privacy advocates and Internet service providers have vocally rallied against spammers, claiming the email overloads people's in-boxes and companies' ISP networks.

Furthermore, while many unsolicited e-mail messages are benign, such as offers for discount office or computer supplies, mortgage rate quotes, or invitations to attend conferences of one type or another, others, such as pornographic, inflammatory and abusive material, are offensive to their recipients. These unsolicited messages are known as "junk" mail or as "spam." The e-mail load from spam can be equivalent to the load generated from legitimate e-mail. Recent indications by one of the biggest ISPs indicate that of the estimated 30 million email messages each day, about 30% on average is unsolicited commercial email. Trends indicate that users will receive more and more spam. For example, it has been estimated that in 1999, the average consumer received 40 pieces of spam. By 2005, it has been estimated that the total is likely to soar to 2000 pieces of spam.

Similar to the task of handling junk postal mail, an e-mail recipient must sift through his incoming mail to remove the spam. The computer industry recognized this problem and has developed techniques to automate the removal of spam. For example, one technique is turf lists. E-mail recipients subscribe to turf lists, which identifies and refuses to accept mail using a defined rule based set of characteristics. Unfortunately, the choice of whether a given e-mail message is spam or not is highly dependent on the particular recipient and the actual content of the message. What may be spam to one recipient may not be spam to another, which limits the functionality of turf lists. Additionally, an electronic mailer (i.e., a spam generator) will prepare a message such that its true content is not apparent from its subject line and can only be discerned from reading the body of the message. Another technique developed is known as a black hole list. The black hole list is a list of known spam addresses from which spam is sent. The e-mail sender's address is checked against the black hole list. If the address is on the list, the e-mail is not accepted. Spam generators simply change their address to bypass this technique.

Other techniques have also been developed. A majority, if not all of these techniques are performed on the client side, which means that the spam still clogs up e-mail servers that store the spam and then deliver the spam to the client where it gets deleted. This wastes storage space and reduces the bandwidth available for legitimate uses. One technique checks to see if the sender of the e-mail is on an authorized list. If the sender is not on an authorized list, the e-mail is stored in a temporary spot and a message that only humans can read is embedded in a graphic image and the sender must reply to the message. If the sender replies, the e-mail is sent to the recipient and the sender's e-mail address is added to the authorized list. Another technique is to send the sender a message that the sender must place in a reply message. For example, the sender is directed to a website to enter a few letters the sender sees for the e-mail to be sent to the recipient. None of the techniques are 100% effective. For example, spammers hire people to respond to messages that only humans can read.

BRIEF SUMMARY OF THE INVENTION

The present invention provides a server side challenge response messaging system for preventing spam at the transport/server layer of e-mail networks. A challenge module analyzes a sender's message and sends a challenge message to the sender if the sender is not in a recipient's address store. The address store contains a list of addresses in which the recipient will accept messages originating from addresses in the list of addresses.

The challenge message includes a pseudo unique token for each sender recipient pair such that the sender must respond differently to each challenge message for a particular message. The token is randomly generated such that the response to the token cannot be used by the sender for another recipient and another sender cannot use the response for the recipient. If the sender does not provide the response, the message is dropped according to policy. If the sender provides the response, the response is compared to a required response for the token. If the response is a correct response, the sender is added to the recipient's address store and the message is delivered to the recipient if the recipient has not flagged the sender to be blocked.

In one embodiment, the challenge requires the sender to obtain a certificate from a certificate authority or a set of authorities and send the certificate as a response to the token. The root certificate authority of the certificate in the response is compared to a list of trusted authorities. If the root certificate authority is a trusted authority, the sender's address is added to the recipient's address store. The recipient may edit the address store to remove addresses.

The actions invoked in dropping the message include returning a non-delivery message to the sender, delivering the message to a junk mail folder, deleting the message without doing anything else, deleting the message and sending a non-delivery message to the sender, and dropping a connection to the sender.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
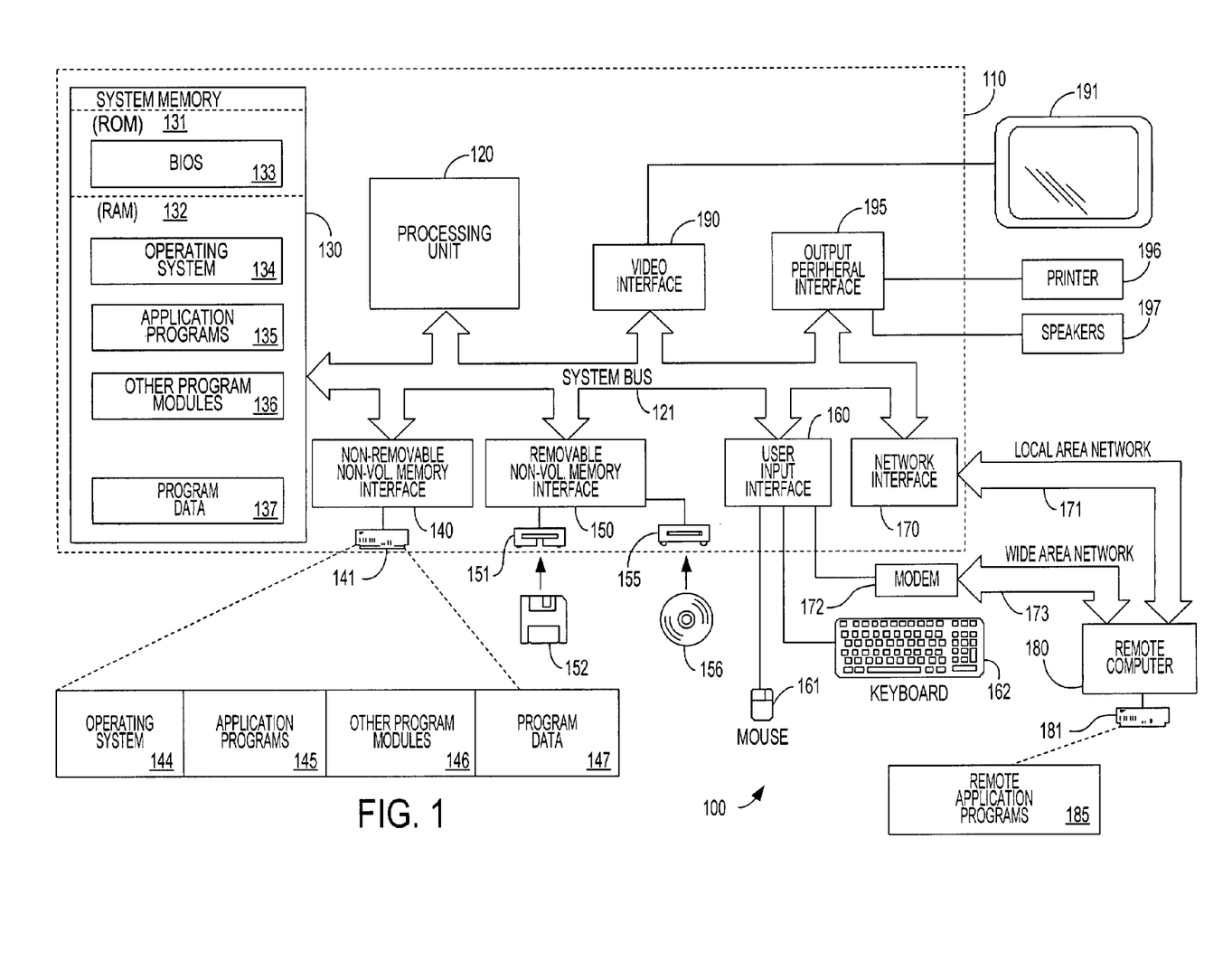
FIG. 1 is a block diagram generally illustrating an exemplary computer system on which the present invention resides.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

The Simple Mail Transfer Protocol (SMTP) with an Exchange server shall be used to describe the invention. Exchange is an e-mail server produced by Microsoft Corporation. SMTP is the predominant email protocol used on the Internet. While SMTP and Exchange will be used, the invention may be used with other transfer protocols and mail servers. SMTP is a Transmission Control Protocol/Internet Protocol (TCP/IP) communication protocol that defines the message formats used for transfer of mail from one e-mail server such as Exchange via the Internet to another e-mail server. According to SMTP, an email message is typically sent in the following manner. A user runs an e-mail program to create an email message and the e-mail program places the message text and control information in a queue of outgoing messages. The queue is typically implemented as a collection of files accessible to the e-mail server.

The Exchange server establishes a Transmission Control Protocol (TCP) connection to the reserved SMTP port on the destination e-mail server and uses the SMTP to transfer the message across the Internet. The SMTP session between the sending and receiving servers results in the message being transferred from a queue on the sending host to a queue on the receiving host in stages. The stages range from the sending server providing the IP address of the connection being established to receiving all the message headers and message content. When the message transfer is completed, the receiving server closes the TCP connection used by SMTP, the sending host removes the message from its mail queue, and the recipient uses his configured e-mail program to read the message in the mail queue.

Figure 2:
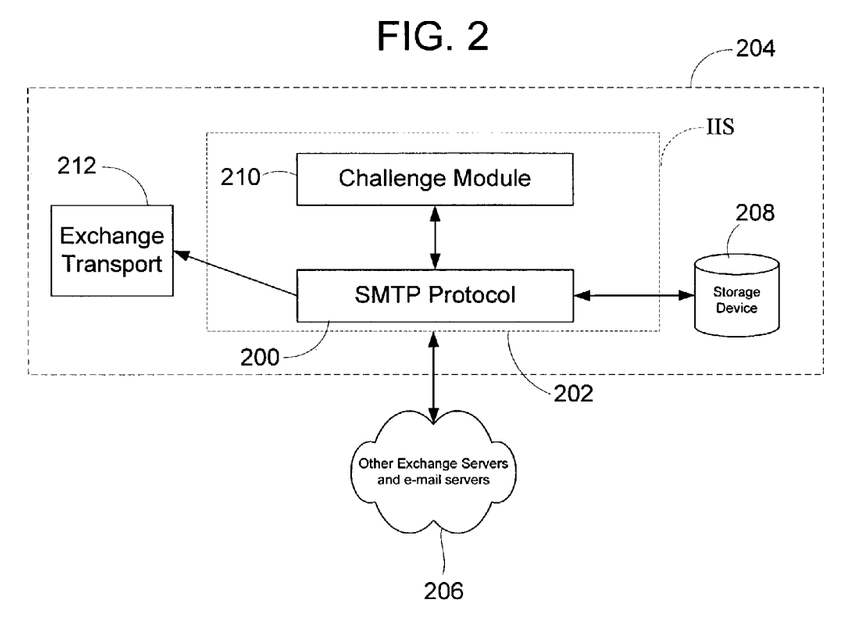
FIG. 2 is a block diagram generally illustrating the framework of the present invention in a system using a SMTP protocol stack.

Turning now to FIG. 2, the SMTP stack 200 runs inside the Internet information server (IIS) 202, which is web server software sold by Microsoft Corporation installed on server 204. The IIS 202 communicates via SMTP to other Exchange servers 206 or SMTP servers (not shown) on the Internet. The IIS 202 has a storage device 208 that is used to store outgoing or incoming messages. The storage device 208 may be any type of computer storage media as previously described. When a connection is established to the SMTP protocol 200 for a message coming in, an event is fired and received by the challenge module 210. The challenge module 210 analyzes the message and determines if the sender of the message is on an authorized list. If the sender is not on the authorized list, the message is stored temporarily in the storage device 208 and the sender is sent a challenge as described below. If the sender is on the authorized list, the message is sent to the Exchange transport 212, which routes the message to the recipient's mailbox. It determines if the message is to be delivered to a mailbox on server 204 or if it needs to go via SMTP 200 to another server 206. The system may be applied to any or all other communications solutions such as Instant Messaging, telephone calls, chat rooms, and e-mail transmitted over protocols other than SMTP, such as HTTP. The system may be used in addition to other anti-spam solutions that may be being used as part of a larger anti-spam system.

The architecture of the SMTP stack 200 in Exchange is such that events are fired by (i.e., sourced from) the stack 200 to event sinks, which are typically implemented as COM objects. Installation of the challenge module 210 includes installing the software on the server in question, registering the event sink, enabling or disabling particular techniques for the particular server via a system administrator console or the like, and establishing the evaluation and action strategies to be followed when mail from an unauthorized sender is received.

Figure 3A:
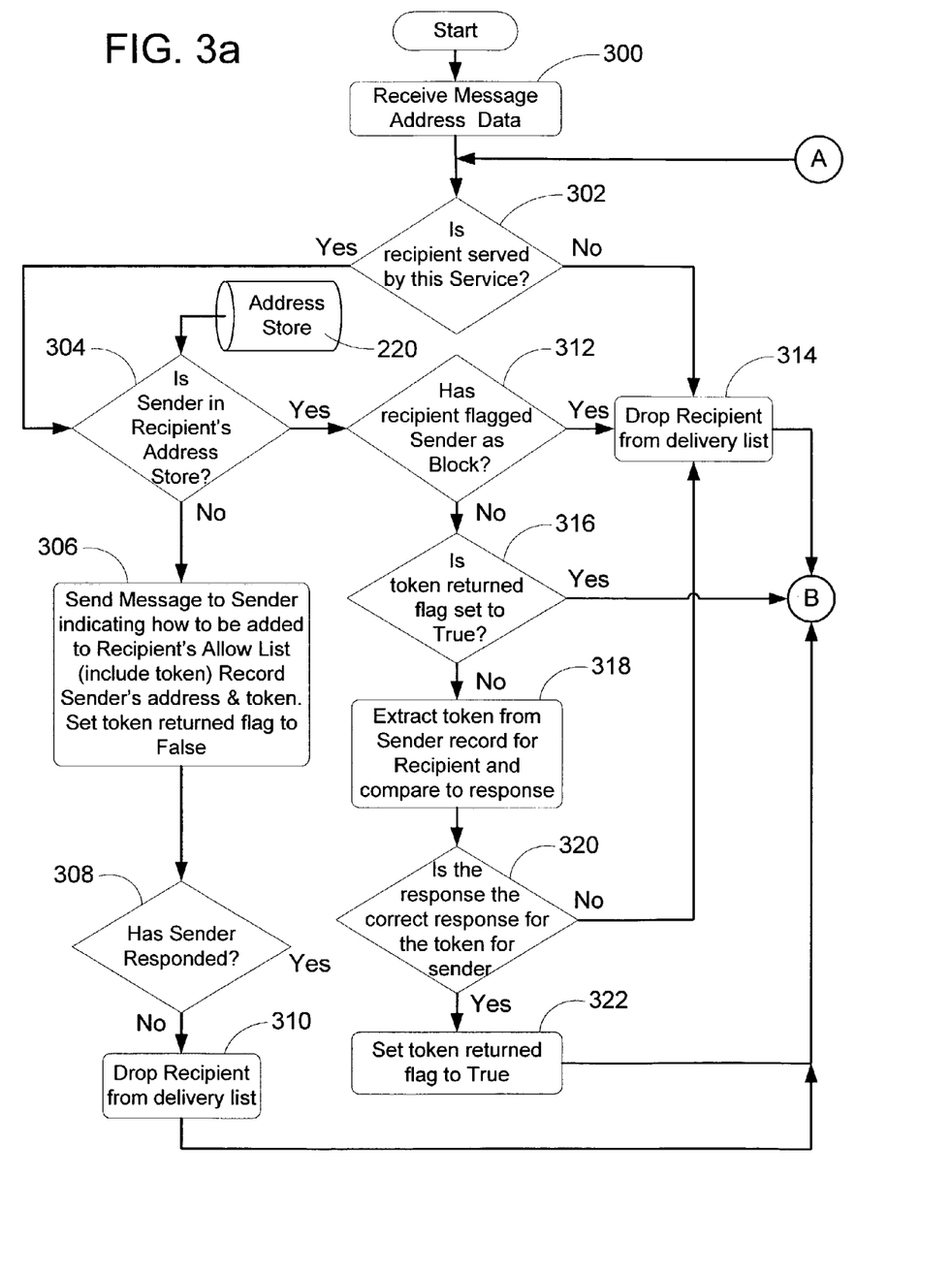
FIG. 3 is a flow chart illustrating the steps taken to determine if a sender's message is to be delivered to a recipient.
Figure 3B:
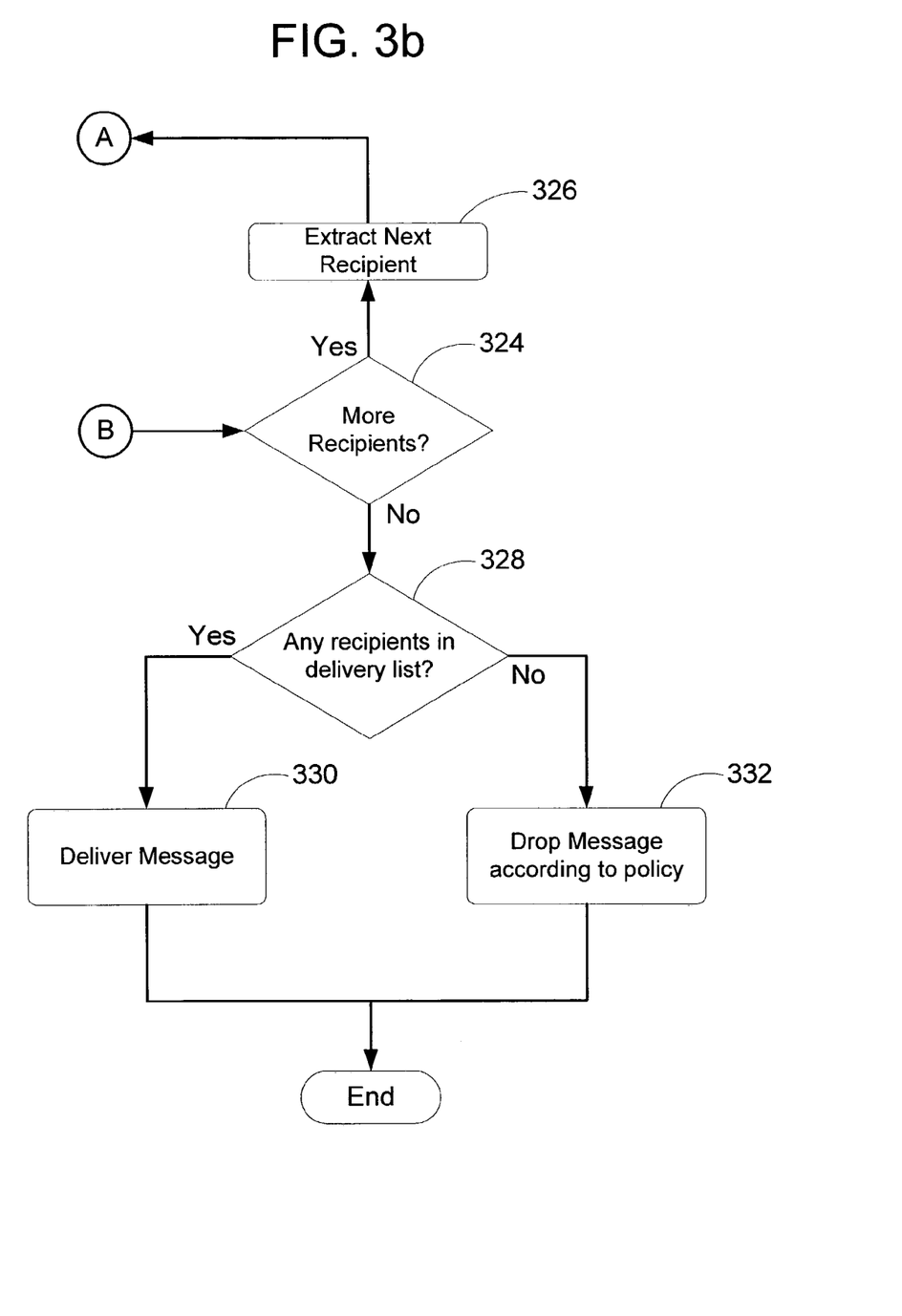

Turning now to FIG. 3, the steps the challenge module 210 takes to populate a list of addresses from whom a recipient is prepared to accept communication and determine if a message is to be delivered to the recipient is shown. The recipient initially identifies the contacts with whom a user will accept messages. When the recipient's e-mail server receives a message, it determines the message address data (step 300). The message address data includes the e-mail addresses of the sender and recipient(s). It may also include usernames and aliases of the sender and recipients if the invention is implemented on chat-room servers and the like. In the description that follows, the term address shall be used to explain the invention. It is recognized that the term address means e-mail address when the invention is implemented for e-mail or username or alias for if the invention is implemented for chat rooms. The challenge module 210 determines if the recipient is being served by the challenge module 210 (step 302). If the recipient is not being served by the challenge module 210, the recipient is dropped from being a recipient of the message (step 314). If the recipient is being served by the challenge module 210, the challenge module 210 examines its server side store 220 of allowable addresses from address store 220 to determine if the sender's address is in the store 220 (step 304).

If the sender is not in the recipient's address store, a challenge message is sent to the sender indicating how the sender can be added to the list of allowable addresses (step 306). The challenge message includes a token (described herein below) that the sender must respond to in order to be added to the list of allowable addresses. The sender's address and token is stored. A set_token_returned flag is set to false to indicate that the sender has not responded to the token. The challenge module 210 determines if the sender has responded to the challenge message (step 308). During the pendancy period between sending the challenge message and receiving a response, any subsequent mail from the sender is stored and a new challenge message and token is generated for that sender. If the sender has not responded after a period of time, the recipient is dropped from being a recipient of the sender's message (step 310). Alternatively, the message may be dropped in accordance with the policy set by the system administrator of the challenge module 210. For example, the policy may be to delete the message without doing anything else, delete the message and send a non-delivery message to the sender, send the message to the recipient's junk mail folder, dropping a connection to the sender, and the like.

If the sender's address is in the store 220 or if the sender has responded to the challenge message, the challenge module determines if the recipient has indicated by her user preferences if the sender has been flagged to be blocked from sending messages to the recipient (step 312). An organization wide block list (i.e., a service provider's block list, a company's block list, etc.) is also checked to determine if the sender's message should be dropped. If the sender has been flagged to be blocked, the recipient is dropped from being a recipient of the message (step 314). If the sender has not been flagged to be blocked, the set_token_returned flag is checked to determine if the flag is set to True (step 316). If the flag is not set to True, the token is extracted from the stored record and the response to the challenge message is compared to the required response of the token (step 318). If the response is not the correct response for the token (step 320), the recipient is dropped from being a recipient of the list. If the response is the correct response for the token, the set_token_returned flag is set to true (step 322).

The challenge module 210 determines if there are more recipients in the message address data (step 324). If there are more recipients in the message address data, the next recipient of the sender's message is determined (step 326) and steps 302 to 324 are repeated for the next recipient. If there are no more recipients in the message address data, the challenge module 310 determines if there are any recipients to which the message is to be delivered (i.e., not all recipients have been dropped from being a recipient of the message) (step 328). The message is delivered if there are recipients that have not been dropped from being a recipient (step 330). If there are no recipients, the message is dropped in accordance with the policy set by the system administrator of the challenge module 210 (step 332).

Now that the overall steps have been described, the details of the challenge message and token shall be described. The token generated is random and pseudo-unique for each recipient-sender pair such that discovering a token would not allow other senders (e.g., spammers) to reach the recipient. This also provides the benefit that knowing the token response for one recipient doesn't allow a sender to be added to address stores for other recipients. The token is generated by a replaceable module to allow different token generators to be used by different message servers. Should spammers attempt to defeat a token generator, a different token generator is used. In one embodiment, the token is an arbitrary string. For example, a generator might simply rotate through a list of words with the challenge and response being that word. This is sufficiently random to make the sender-recipient pair unique. In the event that spammers automate the response to the unique and arbitrary sender-recipient pair, the generator is made more human and less machine friendly as described herein.

Each user has a "skeleton key" token that is generated on first usage. This skeleton key enables scenarios where the user needs to be able to publish their email address to a trusted audience and wants to avoid imposing the inconvenience of the challenge module 210 on them. The skeleton key token is inserted into the user's message and the challenge module 210 does not challenge messages having the skeleton key token in a reply message. However, if the skeleton key token is discovered and used by a spammer, the skeleton key allows the spammer to bypass the challenge module 210. As a result, the user can change the skeleton key token on demand.

The system administrator may configure the challenge message sent to a sender, including language appropriate to their organization or organization's legal requirements. In one embodiment, the challenge message may include the URL (uniform resource locator) of a website that the sender uses to be admitted to the recipient's address store 220. The website provides a user interface to enable the sender to identify themselves, add themselves to the address store, and optionally include the token passed in the message.

The token may be sent as an image file, rather than text, to eliminate automatic replies to the token. When the image is sent to the sender, a machine-readable form of the image is recorded in the system's database for that sender. The system administrator may present the system with a list of suitable text tokens to use in a directory, database, or file. The challenge module 210 will randomly choose tokens from this list. A seed list is provided by the challenge module 210 when it is installed.

The system administrator may configure the system to not require tokens at all. The challenge message requires the sender to send their message a second time. The system administrator may configure the system to not issue a challenge message at all. This is used in scenarios such as in private networks, or a recipient with a relatively unknown domain name. For example, hotmail users (e.g., johndoe@hotmail.com) have a well-known domain name (hotmail.com) where the user ("johndoe") is likely to receive numerous spam messages. A user of a service not as well known (e.g. user@qal;sdkfj.com) is not likely to receive spam messages, so requiring the sender to send their message a second time or not issuing a challenge message is more likely to work since spammers generally send spam to users of well-known domain names.

In an alternate embodiment, the system administrator may configure the system to require a spam certificate. In this case the system will respond to the sender's first message with a request that a spam certificate of a particular class or type or set of classes or types be obtained from a particular Certificate Root Authority (CA), or from a set of such Authorities. The spam certificate is a certificate that indicates that the user has contractually agreed not to send spam. If the user sends spam, the user breaches the contract and legal action can be taken against the user.

Figure 4:
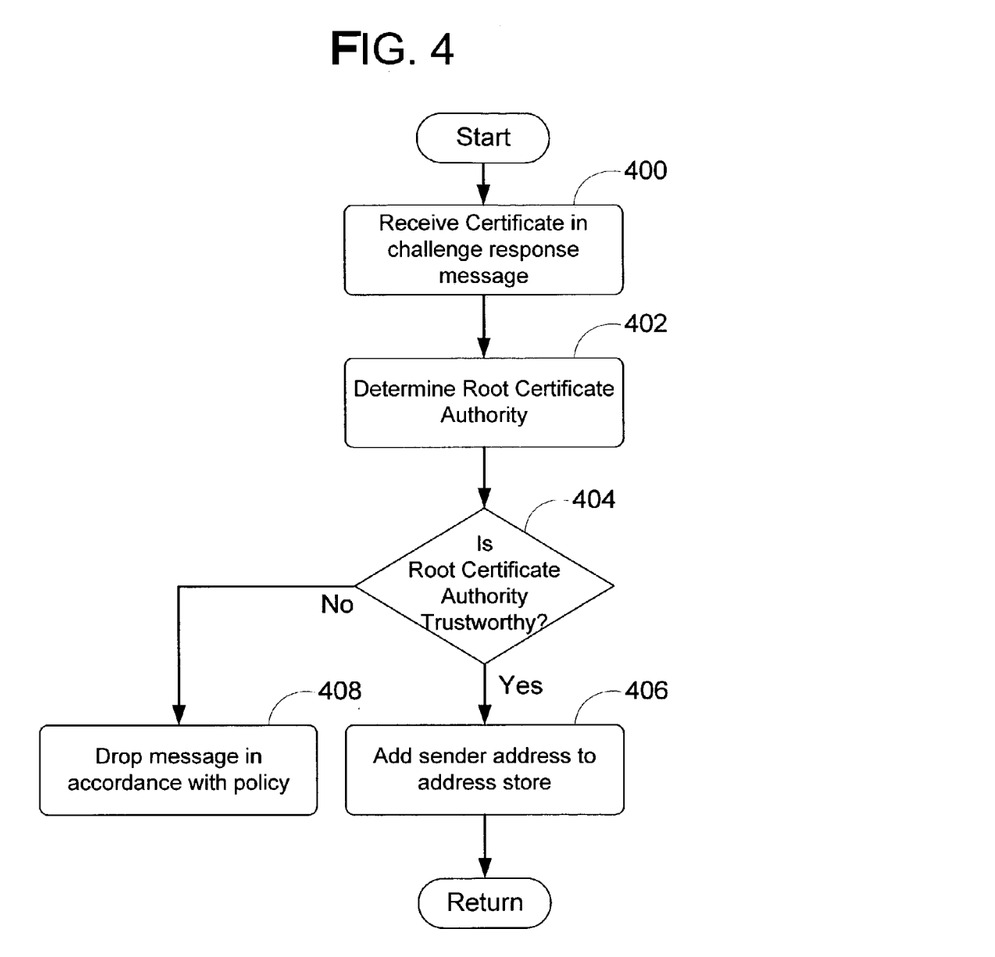
FIG. 4 is a flow chart illustrating the process of determining if a sender's spam certificate is to be added to an address store.

To establish its trustworthiness, the sender must obtain a certificate of the required form from the particular CA or from the set the Authorities identified and send it with the message. The system will verify that the certificate is trustworthy when it receives the second message. Turning now to FIG. 4, the challenge module 210 receives the certificate in the response to the challenge message (step 400). To determine whether a certificate is trustworthy, the identity of the root CA is determined (step 402) and then checked to see if it is trustworthy (step 404). The challenge module 210 maintains a database of trusted message CAs. The challenge module 210 extracts the root certificate from the certification chain and checks it against the CA database. The challenge module 210 verifies that the certificate is current and the identity contained in the certificate matches the root CA identity. If the comparison against the CA database indicates the certificate is acceptable, the challenge module 210 adds the sender to the recipient's address store 220 (step 406). If the certificate is rejected, the message is dropped in accordance with policy (step 408).

The certificate can be used in combination with any of the other techniques described above. The challenge module 210 can be set up to force all messages from the sender to include the token or certificate, not just the initial message.

It can be seen that a platform to challenge spam senders at the edge of the network boundary using a variety of messages and tokens has been described. The platform provides the flexibility to generate the challenge message and tokens in a variety of ways, thereby providing the ability to deploy rapid innovation on the server side in the warlike environment of detecting spam and preventing unwanted messages from being sent to recipients.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of determining if a message from a sender having an address is to be delivered to a recipient, the recipient having an address store, the method comprising the steps of:
   determining if the address is listed in the address store of the recipient;
   if the address is listed in the address store:
      delivering the message to the recipient when the recipient has not flagged the sender to be blocked and blocking the message when the recipient has flagged the sender to be blocked; and
   if the address is not listed in the address store:
      determining if the message from a sender includes a skeleton key token associated with the recipient, said skeleton key token being generated by the recipient and provided to a trusted audience including the sender by the recipient, said skeleton key remaining valid after at least one use;
      if the message includes the skeleton key token, delivering the message to the recipient;
      if the message does not include the skeleton key token:
         sending a challenge message to the sender, the challenge message having a token including instructions that the sender provides a spam certificate to in order for the message to be sent to the recipient, the token being randomly generated such that the token is pseudo-unique for each recipient-sender pair so that another sender cannot use the spam certificate to send a message to the recipient;
if the sender does not provide the spam certificate, dropping the message;
if the sender provides the spam certificate:
  determining a root certificate authority of the spam certificate;
  determining if the root certificate authority is trustworthy, said determining comprising:
    determining if the spam certificate is current; and
    determining if an identity contained in the certificate matches the root certificate authority's identity;
  indicating the spam certificate is correct if the root certificate authority is trustworthy
  and when the spam certificate is correct:
  adding the sender to the address store; and
  delivering the message to the recipient if the recipient has not flagged the sender to be blocked and blocking the message if the recipient has flagged the sender to be blocked.

2. The method of claim 1 wherein the step of dropping the message if the sender does not provide the spam certificate includes dropping a connection to the sender.

3. The method of claim 1 wherein the step of dropping the message if the sender does not provide the spam certificate includes returning a non-delivery message to the sender.

4. The method of claim 1 wherein the step of dropping the message if the sender does not provide the spam certificate includes delivering the message to a junk mail folder.

5. The method of claim 1 further comprising the steps of storing the token and address;
  setting a token returned flag to false to indicate the sender has not responded to the challenge message; and
  setting the token returned flag to true if the spam certificate is correct.

6. The method of claim 1 further comprising the step of providing a user interface to the recipient for editing the address store.

7. The method of claim 1 wherein the step of sending the challenge message includes customizing the challenge message.

8. A computer-readable storage medium for determining if a message from a sender is to be delivered to a recipient, the sender having an address and the recipient having an address store, the computer-readable medium having computer-executable instructions for performing the steps comprising:
  determining if the address is listed in the address store of the recipient;
  if the address is listed in the address store:
    delivering the message to the recipient when the recipient has not flagged the sender to be blocked and blocking the message when the recipient has flagged the sender to be blocked; and
  if the address is not listed in the address store:
    determining if the message from a sender includes a skeleton key token associated with the recipient, said skeleton key token being generated by the recipient and provided to a trusted audience including the sender by the recipient, said skeleton key remaining valid after at least one use;
    if the message includes the skeleton key token, delivering the message to the recipient;
    if the message does not include the skeleton key token:
      sending the sender a challenge message having a unique token for each recipient-sender pair such that another sender cannot use a required spam certificate to the token by the sender to send a message to the recipient and the sender cannot use the required spam certificate to send a message to another recipient, said token having instructions requesting the sender to provide a spam certificate indicating that the sender has contractually agreed not to send spam;
      if the sender does not provide the requested token and the spam certificate, dropping the message;
      if the sender provides the requested token and the spam certificate:
        determining a root certificate authority of the spam certificate;
        determining if the root certificate authority is trustworthy, said determining comprising:
          determining if the spam certificate is current; and
          determining if an identity contained in the certificate matches the root certificate authority's identity; and
        indicating the spam certificate is correct if the root certificate authority is trustworthy;
        comparing the requested token to a stored response for the token; and
        verifying the requested token based on the comparison of the requested token and the stored response for the token;
      if the requested token is verified and the spam certificate is a correct:
        adding the sender to the address store; and
        delivering the message to the recipient if the recipient has not flagged the sender to be blocked and blocking the message if the recipient has flagged the sender to be blocked.

9. The computer-readable storage medium of claim 8 having further computer executable instructions for performing the step of randomly generating the unique token.

10. The computer-readable storage medium of claim 8 having further computer executable instructions for performing the steps of:
  determining if the address is in an organization wide block list; and
  dropping the message if the address is in the organization wide block list.

11. The computer-readable storage medium of claim 8 wherein the step of dropping the message if the sender does not provide the spam certificate includes one of dropping a connection to the sender, returning a non-delivery message to the sender, and delivering the message to a junk mail folder.

12. The computer-readable storage medium of claim 8 having further computer executable instructions for performing the steps of storing the token and address;
  setting a token returned flag to false to indicate the sender has not responded to the challenge message; and
  setting the token returned flag to true if the spam certificate is correct.

13. A computer-readable storage medium for determining if a plurality of messages from a sender is to be delivered to a recipient, the sender having an address and the recipient having an address store, the computer-readable medium having computer-executable instructions for performing the steps comprising:
  a) receiving a first message from the sender to be delivered to the recipient;
  b) determining if the address is listed in the address store of the recipient;
    if the address is listed in the address store, delivering the message to the recipient when the recipient has not flagged the sender to be blocked and blocking the message when the recipient has flagged the sender to be blocked; and if the address is not remaining valid after at least one use listed in the address store, determining if the first message from the sender includes a skeleton key token associated with the recipient, said skeleton key remaining valid after at least one use;

if the first message includes the skeleton key token, delivering the message to the recipient;

if the first message does not include the skeleton key token, issuing a challenge message to the sender, said challenge message having a unique token for each recipient-sender pair such that another sender cannot use a required spam certificate to the token by the sender to send a message to the recipient and the sender cannot use the required spam certificate to send a message to another recipient, said token having instructions requesting the sender to provide a spam certificate indicating that the sender has contractually agreed not to send spam;

c) determining if the sender provides the requested token and the spam certificate;

if the sender does not provide the requested-token and the spam certificate, dropping the first message;

if the sender provides the requested token and the spam certificate:

determining a root certificate authority of the spam certificate;

determining if the root certificate authority is trustworthy said determining comprising:

determining if the spam certificate is current; and determining if an identity contained in the certificate matches the root certificate authority's identity; and indicating the spam certificate is correct if the root certificate authority is trustworthy;

comparing the requested token to a stored response for the tokens; and verifying the requested token based on the comparison of the requested token and the stored response for the token;

d) determining if the requested spam certificate is correct and the requested token is a correct token:

if the requested spam certificate is correct and the requested token is verified, adding the sender to the address store and delivering the first message to the recipient when the recipient has not flagged the sender to be blocked and blocking the first message when the recipient has flagged the sender to be blocked;

if the requested spam certificate is not correct or the requested token is not verified, or both, dropping the first message;

e) receiving a second message from the sender to be delivered to the recipient; and f) repeating b), c), and d) with respect to the second message.

* * * * *